3,102,814
SHORTENING

Stuart W. Thompson, Upper Saddle River, N.J., assignor to Lever Brothers Company, New York, N.Y., a corporation of Maine
No Drawing. Filed Mar. 10, 1961, Ser. No. 94,717
5 Claims. (Cl. 99—118)

This invention relates to plastic shortenings and more particularly to plastic shortenings containing soybean oil stearine in the beta crystalline phase.

Plastic shortenings are conventionally prepared by combining a major proportion of an unhydrogenated or partially hydrogenated fat called the base stock with a minor proportion of a substantially completely hydrogenated fat called the hard stock. The softening action of the base stock is balanced with the hardening action of the hard stock to obtain a shortening of a desired consistency.

Plastic shortenings derived from hydrogenated vegetable oils such as cottonseed oil are normally prepared with the solid constituents in the beta-prime crystalline phase. Where the hard stock and an appreciable amount of the base stock are derived from cottonseed oil, the shortening is stable and remains in the beta-prime phase. Thus, there is no appreciable change in the physical properties of the shortening under common storage conditions involving wide temperature fluctuations. In recent years, the reduced availability of cottonseed oil has led to the increased use of soybean oil in plastic shortenings. However, a shortening composed of a soybean oil base stock and a cottonseed oil hard stock becomes much softer or much harder after storage at temperatures above 90° F. or under widely fluctuating temperature conditions and may actually be accompanied by a change in the crystalline phase from beta-prime to beta phase. A reduction in cake baking performance results from such a change. For a definition of beta, beta-prime, and other polymorphic forms of fats and their determination by means of X-ray diffraction patterns, reference can be made to an article by E. S. Lutton in the Journal of the American Chemical Society, vol. 67, page 524 (1945).

Plastic shortenings which are in the more stable beta phase when prepared are desirable since they are not susceptible to phase changes and exhibit superior cake baking performances over those plastic shortenings which are in the beta-prime phase. U.S. Patent No. 2,801,177 discloses plastic shortenings containing a major proportion of a base stock of 80 to 95 iodine value and a minor proportion of a hard stock of iodine value less than 10, the latter being in the beta crystalline phase. According to this patent, the hard stock must contain not less than 90% of fatty acids containing 18 carbon atoms. This limitation would exclude soybean oil which contains approximately 88% fatty acids containing 18 carbon atoms. This patent states that a shortening made with soybean oil hard stock and soybean oil base stock is unsuitable as a beta shortening since the beta forming tendency of the soybean hard stock is not sufficiently strong.

Accordingly, it is an object of this invention to prepare a plastic shortening containing a soybean oil base stock and a soybean oil hard stock, the latter being in the beta phase.

It is a further object of this invention to prepare a plastic shortening which is stable when stored at temperatures above 90° F. or when stored under conditions involving widely fluctuating temperatures.

It is still another object of this invention to prepare a beta phase plastic shortening of acceptable quality and cake baking performance.

It has been discovered that an acceptable beta phase plastic shortening can be prepared solely from soybean oil if the hard stock is subjected to a molecular rearrangement or interesterification either before or after hydrogenation.

Generally speaking, the soybean oil base stock used in the shortenings of this invention is present in the major proportion while the soybean hard stock is present in minor proportion. Preferably, about 85% to 92% by weight of the shortening comprises the base stock while the hard stock is present in amounts of about 8 to 10% by weight. It is preferred to also include up to about 5% by weight of a conventional shortening emulsifier such as a mono-diglyceride concentrate. Amounts of the hard stock above about 10% are undesirable since the melting point of the shortening is too high for practical purposes.

The iodine value of the base stock may vary from about 80 to 95 although a value of about 85 represents a good compromise between the keeping qualities and the beta forming properties of the shortening. The hard stock should have an iodine value of not more than about 5, although it is preferred that this ingredient be substantially fully hydrogenated.

The interesterification of the hard stock can be accomplished by conventional means so long as the rearrangement is substantially complete. Thus, interesterification has been accomplished at temperatures of 200° C. or above, using a simple caustic catalyst. If a sodium methoxide catalyst is to be utilized, temperatures of about 50° to 100° C. are satisfactory. As with conventional rearrangements of this type, a complete absence of moisture is required.

The plastic shortenings are manufactured in the conventional manner by methods which are well known to the industry. Briefly, the method used involved the following steps: the ingredients were melted and pumped through a refrigerated tube. The cooled shortening was run into containers and tempered or conditioned for about 2 to 5 days at about 90° F. Finally, the shortening was held at 70° F. for about 1 day.

Example 1

Plastic shortenings were prepared containing 10% of a substantially completely hydrogenated hard stock derived from the following oils: (A) sunflower, (B) soybean, (C) interesterified soybean. In addition, each shortening contained 85.5% by weight of soybean oil base stock (85 I.V.) and 4.5% of mono-diglyceride concentrate derived from 75 I.V. cottonseed oil. Each of the 3 shortenings was chilled in the conventional manner by running through a laboratory-type votator, tempered at 90° F. for 2 days and stored at 70° F.

X-ray diffraction patterns of shortenings A and C disclosed the presence of only beta phase crystals whereas the pattern of shortening B indicated the presence of some beta-prime phase crystals.

In order to compare shortenings A and C with a well known commercial beta prime phase shortening, the shortenings were used in a household, "one-bowl," white layer cake recipe. The results were as follows:

| Shortening— | Cake volume, cc. |
|---|---|
| Commercial (beta-prime phase) | 1100 |
| A (beta phase) | 1125 |
| C (beta phase) | 1155 |

Samples of these shortenings were stored alternatively at −10° F. and 90° F. for periods of 3 to 4 days (3 periods at each temperature), and then stored for 1 week at 105° F. After being returned to 70° F., the samples were again tested in the same cake recipe as above, with the following results:

| Shortening— | Cake volume, cc. |
|---|---|
| Commercial (beta-prime phase) | 1040 |
| A (beta phase) | 1160 |
| C (beta phase) | 1155 |

The interesterified soybean oil hard stock of shortening C was prepared by reacting substantially completely hydrogenated soybean oil hard stock at 90° C. for 1 hour in the presence of 0.3% sodium methoxide. An amount of hot water equal to 50% by weight of the oil was added to inactivate the catalyst. The oil was then refined by adding 6% of 12° Bé. lye containing 2% sodium chloride at 50° C., agitating for 5 minutes, and allowing the mixture to settle. The oil was decanted, treated at 80° C. with 0.5% of neutral earth for 15 minutes and filtered.

*Example 2*

Three plastic shortenings were prepared in the conventional manner as outlined above and contained about 86% by weight of hydrogenated soybean oil (85 I.V.), about 4% of mono-diglyceride concentrate (derived from 85 I.V. hydrogenated soybean oil containing approximately 45% monoglycerides), and about 10% of the following ingredients as the hard stock components: (D) hydrogenated cottonseed oil (2 I.V.), (E) hydrogenated safflower oil (1 I.V.), (F) hydrogenated interesterified soybean oil (1 I.V.). These shortenings were tempered at 90° F. for 2 to 5 days and held at 70° F. for 2 days before being used in the cake recipe described in Example 1. Additional samples were treated as in Example 1 by cycling between −10° F. and 90° F., followed by storage at 105° F. and 70° F. and then tested in the cake recipe. The results were as follows:

| Shortening | Original sample | Cake volume, cc.—Cycled sample |
|---|---|---|
| D | 1,100 | 1,075 |
| E | 1,150 | 1,160 |
| F | 1,175 | 1,170 |

The soybean hard stock of shortening F was interestrified prior to hydrogenation by heating the oil at 90° C. with 0.3% by weight of sodium methoxide for 1 hour followed by the addition of ½ the amount of phosphoric acid theoretically required to completely neutralize the catalyst. After filtering out the insoluble mixed acid phosphates, the oil was subsequently completely hydrogenated.

The results of the examples show that a suitable plastic beta phase shortening can be prepared from a soybean base stock and a soybean hard stock despite the prior art disclosure to the contrary.

The "one-bowl" white layer cake test described in the above examples is as follows:

| Recipe | Grams | Volume measurement |
|---|---|---|
| Flour | 200 | 2 Cups. |
| Sugar-Fruit-Fine | 250 | 1¼ Cups. |
| Baking Powder—"Calumet" | 14 | 3½ Tsp. |
| Salt | 4 | 1 Tsp. |
| Shortening | 95 | ½ Cup. |
| Fresh Whole Milk | 210 | 1 Cup less 2 Tbsp. |
| Egg Whites (from shell eggs) | 90 | 3 Whites from 3 eggs med. |
| Almond Flavor | 4 | 1 Tsp. |

*Machine method (Sunbeam Mixmaster).*—The flour, sugar, baking powder and salt are sifted into a mixing bowl and the shortening, flavor and two-thirds of the milk are thereupon added. After beating for 2 minutes at #4 speed, the bowl and beaters are scraped with a Spry spatula. After adding the egg whites and remaining milk, beating is commenced for 2 minutes at #4 speed. The bowl and beaters are scraped as before and mixing is again continued for 2 minutes at #4 speed. The batter is divided between two paper-lined greased 8″ layer cake tins and the cakes are baked for 22 minutes at 360° F.

Volumes are taken and cakes examined on the morning after they are baked.

It will be understood that the described embodiment of the invention is illustrative only and that modifications will occur to those skilled in the art. Therefore, the invention is not to be limited to the specific examples described herein, but is to be defined by the appended claims.

I claim:
1. A plastic shortening comprising from about 8% to about 10% by weight of an interesterified soybean oil hard stock having an iodine value less than 5 and from about 85% to about 92% by weight of a soybean oil base stock having an iodine value of 80 to 95, the crystalline solids of said shortening being predominantly in the beta crystalline phase.
2. The shortening of claim 1 wherein the base stock has an iodine value of about 85 and the hard stock has an iodine value of about 1.
3. A plastic shortening comprising: (a) about 86% by weight of a soybean oil base stock having an iodine value of about 85; (b) about 10% by weight of a substantially completely hydrogenated, interesterified soybean oil hard stock; (c) about 4% by weight of a mono-diglyceride emulsifier, the crystalline solids of said shortening being predominantly in the beta crystalline phase.
4. The shortening of claim 3 wherein the mono-digylceride component is derived from a cottonseed oil having an iodine value of about 75.
5. The shortening of claim 3 wherein the mono-diglyceride is derived from soybean oil having an iodine value of about 85.

References Cited in the file of this patent

UNITED STATES PATENTS 2,801,177    Lutton _____ July 30, 1957